No. 743,972. PATENTED NOV. 10, 1903.
P. BELLE.
MACHINE FOR MAKING PASTED LEATHER STOCK.
APPLICATION FILED MAR. 21, 1903.
NO MODEL. 7 SHEETS—SHEET 4.

Witnesses: Philias Belle, Inventor,
By Marion & Marion
Attorneys

No. 743,972. PATENTED NOV. 10, 1903.
P. BELLE.
MACHINE FOR MAKING PASTED LEATHER STOCK.
APPLICATION FILED MAR. 21, 1903.
NO MODEL. 7 SHEETS—SHEET 6.

Witnesses:
John F. Dufferwiel
George W. Colles

Philias Belle, Inventor,
By Marion & Marion
Attorneys

No. 743,972. PATENTED NOV. 10, 1903.
P. BELLE.
MACHINE FOR MAKING PASTED LEATHER STOCK.
APPLICATION FILED MAR. 21, 1903.
NO MODEL. 7 SHEETS—SHEET 7.

Witnesses: Philias Belle, Inventor,
By Marion H Marion
Attorneys

No. 743,972. Patented November 10, 1903.

UNITED STATES PATENT OFFICE.

PHILIAS BELLE, OF MONTREAL, CANADA.

MACHINE FOR MAKING PASTED LEATHER STOCK.

SPECIFICATION forming part of Letters Patent No. 743,972, dated November 10, 1903.

Application filed March 21, 1903. Serial No. 148,939. (No model.)

*To all whom it may concern:*

Be it known that I, PHILIAS BELLE, a subject of the King of Great Britain, residing at the city and District of Montreal, Province of Quebec, Canada, have invented a new and useful Machine for Making Pasted Leather Stock; and I do hereby declare that the following is a full, clear, and exact description of the invention, such as will enable others skilled in the art to which it appertains to make and use the same.

My invention relates to a machine for making what is known in the trade as "pasted leather stock"—that is to say, a composition which is made in the form of sheets adapted for cutting the soles, particularly the insoles, of shoes and being composed of small leather scraps in a fibrous or strip condition compounded and solidified by means of paste or glue. Heretofore large quantities of this stock have been made by hand from waste materials, the same being compacted in a frame, pounded to render the same homogeneous, and thereafter placed under heavy hydraulic pressure until partially or wholly dried, thus producing a very solid and fairly good wearing material which has sufficient body and cohesive force to adapt it for insoles and other like uses where the best quality of leather is not required. The process, however, of making this stock as at present carried on is very defective for several reasons. In the first place it takes a large amount of time. In the second place it is an extremely uncleanly operation, as it involves the pounding of the paste and leather composition by rollers which are operated by hand, and the paste necessarily is spattered over the persons of the operatives. Furthermore, the stock, even when completed, has a tendency to unevenness and irregular and varying quality, due to the varying amount of labor and skill expended in the pounding operation by the different operatives.

It is the object of my present invention to dispense either wholly or partly with hand-labor in the making of pasted stock, especially with the pounding operation, and to perform the operation of filling the mold and compressing the material therein entirely by a mechanical process, thus not only greatly expediting the manufacture and enabling many times the number of sheets to be turned out by a machine that an experienced operative can make, but also rendering the quality of the work even and regular and producing a greater degree of compression, and thus a greater degree of solidity in the sheet, and to generally improve the finished product.

To these ends I have established a new process adapted to the use of a machine for making the stock. Said process does not form the subject of the present application, as I intend to claim the same in a separate application; but the nature of the process will appear from the accompanying description.

It consists, generally speaking, in filling the mold, compressing either partially or wholly the stock placed therein, and finally, as it becomes sufficiently and regularly compressed, passing a knife immediately above the mold, and thus severing the superfluous portion of the stock which overfills the mold, and conveying the latter away for use over again. The superfluous material thus "sliced away," so to speak, from the material filling the mold leaves a smooth and even surface, and by consequence a sheet of regular thickness and density. The subsequent processes consist in folding a sheet of thin material, such as skived leather or paper, over the partially-compressed sheet, removing it from the mold and placing it under heavy pressure in a hydraulic or other press until ready for use.

Although various machines may be adapted to carry out my process, the present application is limited to a special machine which I have devised for that purpose, which is shown in two embodiments, in one of which the raw material, consisting of a mixture of paste and leather scraps suitably comminuted, is compressed by a fixed pressure before and during the action of the slicing-knife, whereas in the other the compression is produced in a manner somewhat similar to that now customarily employed—that is to say, by means of a distributing-roller—which is made to reciprocate rapidly with a hammering or pounding motion on the material in the mold and to spread or compact the same, the mold being moved gradually along as the pounding proceeds, so as to be continuously sliced off by the knife. In both embodiments of my invention, as herein shown, the slicing-knife comprises an endless or band knife, which is moved continuously in one direction over pulleys rotated at a rapid rate and located at opposite sides of the machine. In both embodiments also I employ a pair of parallel ways or tracks supported on heavy beams which bear the weight of the pressure brought upon the material, which beams are pivoted at one end and may be raised or lowered by mechanical connections, such as a toggle-joint, at the other end, and I arrange the mold to travel on these ways. Immediately above the mold is located either the press or the distributing-roller above alluded to, as the case may be, and one lap of the slicing-knife is caused to pass immediately over the mold, the mold being slid along the ways at right angles to the knife during the cutting process, while at the back of the knife is located a plate which covers the mold and in the case of the press arrangement supports the material yet in the press which has been sliced away from the mold by the action of the knife, and in the case of the roller-form of the invention receives the waste material in like manner.

My invention consists, further, in the constructions and combinations of parts hereinafter described, and more particularly pointed out in the claims.

In the drawings accompanying this specification.

In carrying out my invention I preferably arrange a frame comprising corner-posts 16, resting on a pair of horizontal longitudinal beams 17 and transverse beams 17ª, and joined together at the top by similar longitudinal beams 18 and transverse beams 19. In the present instance I have illustrated two such units located side by side, the frames being naturally consolidated with each other, and in like manner a series comprising any number of such units may be located side by side, depending on the size of the plant desired, all of these units being acted on by the same band-knife 20, which traverses them in the manner which will be hereinafter described, and is mounted on a pair of pulleys 21, having each a flange 22 on its forward side, these pulleys being mounted on opposite sides of the set of units in journal-boxes 23, these latter being mounted to slide in longitudinal ways 24, formed on the end of brackets 25, which may be supported by the outside unit, and the journal-boxes 23 are provided with tightening means, such as screws 26, engaging with threaded sockets in the brackets 25, whereby the two pulleys 21 may be forced apart, so as to tighten the band-knife to the requisite extent. The frames of the several units are shown as being provided with additional horizontal beams 27 and 28, located, respectively, at the front and rear for supporting the parts of the machine, and of course it will be understood that such other supports and braces are provided as a good engineering design may require, but which are not of sufficient importance to be illustrated herein.

The band-knife 20, as shown, is so located as to pass transversely and centrally across the several machine units at about the height of three feet or so above the ground, the lower lap of said knife returning directly under the upper lap at a convenient distance, which is immaterial so long as it does not interfere with the operating parts of the machine. Coöperating with the upper lap of the knife are a pair of longitudinal beams 29, which have V-shaped ways 30, formed or mounted on their upper edges. These beams 29 are, as shown, provided with hinge-brackets 31 at their rear ends, which engage over a transverse pintle-rod 32, supported by two or more eyebolts 33, which pass through perforated bracket-lugs 34, secured to the rear of the frame of the machine, and rest thereon by means of nuts 35, engaging with their upper ends, whereby the ways 30 may be accurately adjusted to the proper level by manipulating the nuts 35. The pintle-rod 32 acts as a hinge for the beams 29, the pair of which belonging to each unit are suitably joined together by transverse blocks 36 37, to keep the ways parallel with each other. At their front ends the beams 29 are supported upon a pair of toggle-joints 38, each comprising a pair of link members 39 40, the former of which is keyed, as shown, upon a transverse shaft 41, journaled at the lower part of the front pair of posts 16 of the machine, while the upper member 40 of the joint is pivoted to a pair of lugs 42, projecting from the lower side of the beam 29 by means of a pintle 43.

Figure 4:
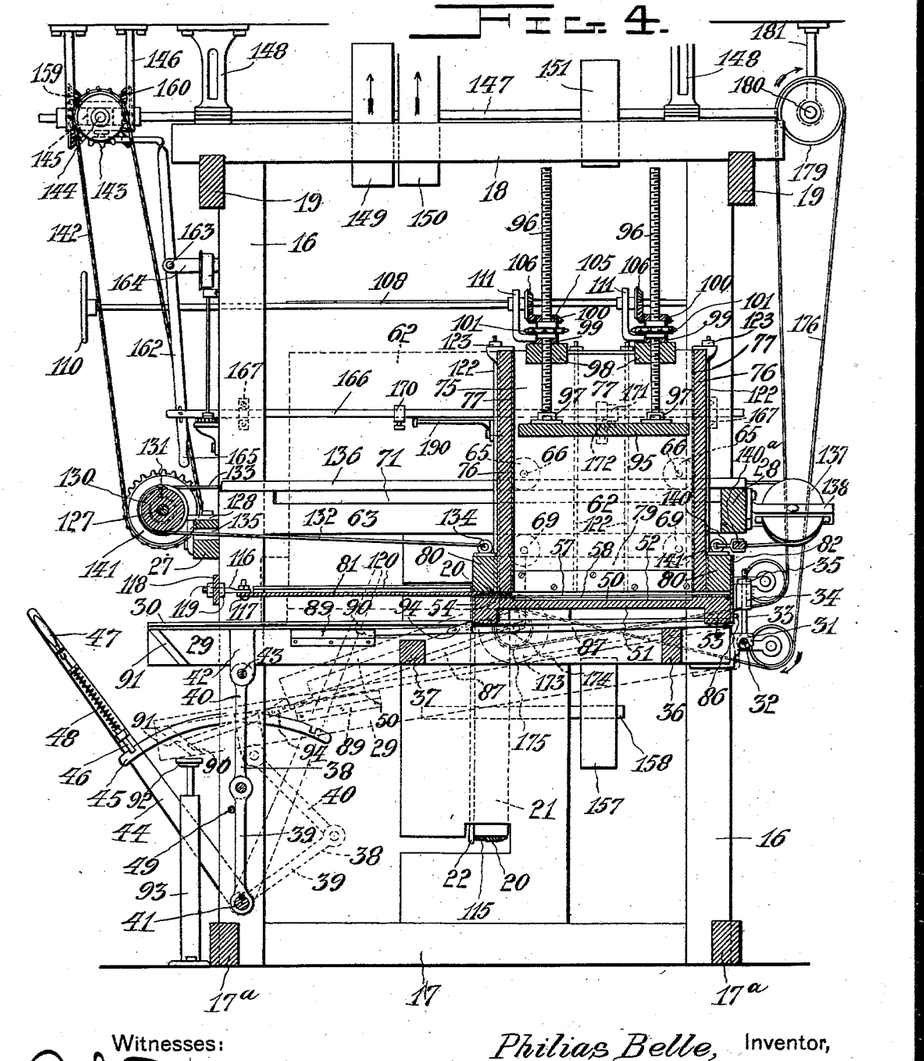
Fig. 4 is a longitudinal central section through one of the machine units shown in Fig. 1—that is to say, on the line 4 4 of Fig. 1.

The shaft 41 is arranged to project some distance beyond the post 16 at one end, and has clamped or otherwise secured thereto a hand-lever 44, which may be oscillated in an arc of a circle and is retained in position by means of a notched quadrant-bar 45, with which engages the bolt 46 of a finger-lever 47, the latter being held in the position shown in Fig. 4 by means of a spring 48, this being illustrated merely as a very common construction, whereby the hand-lever may be readily engaged and disengaged from the quadrant-bar, and thus held in the position in which it is placed. It will be seen that by manipulating the lever 44 the beams 29 may be raised and lowered, the position shown in full lines in Fig. 4 being that in which the toggle-joint 38 is straightened and the beams consequently raised, the toggle-joint being held in this position by the transverse bar 49, against which the lower members 39 of the toggle-joint rest, being slightly bent forward beyond the central position, as will be readily understood.

The mold (designated as a whole) 50 is arranged to slide on the horizontal ways 30 and is of a form somewhat similar to the old form in which the pasted stock was made by hand, but provided with certain constructions which adapt it to use in my machine. This mold is clearly shown in perspective views in Figs. 8, 10, and 11. It consists of a rigid base-plate 51, provided on its upper side with a rectangular recess 52, concentric with the periphery of said base-plate and formed of the proper size of the finished sheet of stock. At each end the mold is provided with a pair of downwardly-projecting ribs 53 54, respectively, at the rear and front ends of the mold, each of these having a pair of V-shaped notches 55, fitted to slide on the ways 30, and a second pair of similar but smaller V-shaped notches 56 between the two notches 55 for the purpose which will be hereinafter described. Hinged to the rear side of the base 51 is a cover-plate 57, which practically entirely covers the upper side of the mold, but has a central rectangular aperture 58, whose edges coincide with those of the recess 52.

Figures 10, 12:
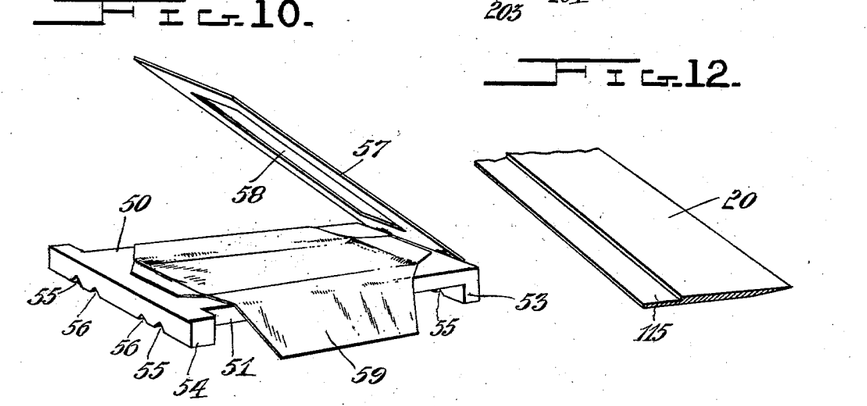
Figs. 10 and 11 are perspective views of the mold, showing the manner of handling the pressed stock.
Fig. 12 is a perspective sectional view of the slicing-knife.
Figure 11:
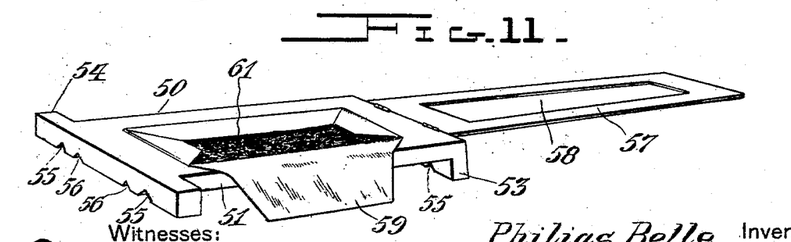

The manner in which the mold is operated and the purpose of the cover-plate 57 are well illustrated in Figs. 10 and 11. These figures illustrate equally well the process of forming the pressed material either by hand or by machine. First, a rectangular sheet of skived leather (preferably what is known as a "flesher"—that is to say, a skiving from the flesh side of the leather—which is of little value) or strong paper 59 is taken, having sufficient size to cover the bottom of the recess 52 and lap over a considerable distance at each side, as shown in Fig. 10. The corners of the rectangular sheet 59 should be cut away obliquely, as shown, so as to prevent the edges of the folded sheet from lapping over each other, and thus forming an objectionable crease. When the sheet has been laid flat, as shown in Fig. 10, the cover-plate 57 is laid down over it and the raw stock 61 is then placed in the mold and suitably distributed and compressed, either by hand or machine, as the case may be, after which the cover-plate 57 is opened, as shown in Fig. 11, and the loose flaps of the sheet 59 folded over on the upper side of the sheet of stock, as shown. When this is done, the compressed sheet may be taken out and subjected to proper pressure in the hydraulic press, as aforesaid. It is customary to leave the sheets in the hydraulic press for a period of about an hour, after which they are hung up to dry either in a suitable drying-room or in the open air.

The mold 50 is fitted, as aforesaid, to slide on the ways 30, these ways being when raised, as shown in full lines in Fig. 4, in substantially horizontal position. In this position the mold is directly beneath the knife 20 and in contact therewith, the knife 20 being arranged to move transversely in contact with the metal cover-plate 57. When in operative position, the mold is arranged to be locked up to the lower face of the press-box, (designated 62,) and shown as a whole in front elevation in Fig. 5, in transverse section in Fig. 6, and in longitudinal section in Fig. 4. This press-box is arranged to roll on a pair of longitudinal beams 63, secured at the sides of the framework, which are provided at their upper sides with rail-straps 64, on which rest rollers 65, turning on pintles 66, formed on bracket-plates 67, bolted to the sides of the press-box, and on their under side the beams 63 are likewise provided with rail-straps 68, with which engage the underrunning rollers 69, mounted to turn on brackets 70 in the same manner as the rollers 65. In addition I prefer to provide a buffer-rail 71 on the interior side of each of the beams 63, which abut against the side of the press-box 62 and prevent it from having any lateral motion. In order to adjust this rail to take up wear, due to the constant sliding back and forth of the box, I also mount the rail 71 on a series of adjustable screw-stems 72, turning in threaded socket-pieces 73, mounted in the side of the beams 63, the screw-stems 72 being provided at their outer ends with heads 74, suitably formed for turning with a wrench or "tommy." The press-box 62 is thus accurately directed in its reciprocating motion backward and forward in the frame.

The press-box 62 is of rectangular form, open at both ends, as shown, being composed of two lateral side pieces 75 and front and rear side pieces 76, strongly bound together, or, if desired, cast integral in metal, and in general I provide the box with a lining of sheet-copper 77, which prevents the material from becoming discolored and injuriously affected by rust, if the box is made of metal, and prevents the liquid portion of the material from being soaked up by the sides of the box where they are made of wood. Near the bottom of the box on its inner side the lateral sides are provided with oblique offsets 78, which narrow or choke the bore of the box, these offsets being intended to force the semi-liquid mass of raw material in the box together and compact the same just before it passes into the mold, and they serve the further additional purpose of causing the material to be more evenly distributed. Similar offsets might be formed on the front and rear sides of the box; but I prefer to omit them, as they have been found in practice to be unnecessary. The lining 77, as shown, projects slightly below the lower end of the side pieces, so as to carry the material as close as possible to the cover-plate 57 of the mold, only sufficient space being left between them for the passage of the knife 20. Around the bottom of the press-box, as shown, are provided a set of four beams 79 80, which are partly for the purpose of holding the sides of the box together against the internal pressure, but also serve other purposes, which will be hereinafter specified.
The mold is locked in place on the bottom of the press-box, as follows, it being understood that this locking is such as to cause the mold to move solidly with the press-box, while at the same time being connected therewith only at the rear edge in order to permit of the passage of the knife 20 and a division-plate 81 at the rear of the knife, which will be referred to presently: The rear cross-beam 80 at the base of the press-box is provided with a plate 82, secured thereto by screws 83 or other suitable means, and which has a flap 84 projecting downwardly below the bottom of the press-box and covering the rear end of the mold when in place. This flap 84 has formed therein a pair of holes 85, in which engage guide-pins 86, projecting from the rear end of the mold. In order now to guide these pins into suitable engagement with these holes 85, I provide a pair of supplementary tracks consisting of steel bars 87, which are hinged at their rear ends, as at 88, to the lower edge of the flap 84. The rails 87 are located close to the inner sides of the beams 29 and project forwardly for a certain distance along these beams, their front ends being supported normally by longitudinal guide-brackets 89, secured to the inner sides of the beams 29. The upper edges of the rails 87 are formed with a V-shaped edge, as shown, Figs. 5 and 6, which engages with the notches 56 in the ribs 53 and 54 of the mold. The rails 87 are, as shown, not as long as the beams 29, but are shorter by an amount sufficient to leave room for the full reciprocation of the press-box, so that when the press-box reaches the front end of its travel the ends of the rails 87, which are cut obliquely, as shown at 90, will abut against the upper portion of a pair of oblique ribs 91, formed on or secured to the inner side of the beams 29. When the press-box has reached the forward extremity of its movement and a slice of compressed material has been cut off by the knife 20 in the mold 50, the latter will be ready for removal, and consequently the lever 44 will be operated to lower the beams 29, the latter then resting in the oblique position, (shown in dotted lines in Fig. 4,) and they will preferably strike against and be supported by suitable pedestals 92, which reciprocate vertically in tubular standards 93, secured to the floor, and are supported resiliently at their lower ends within the standards by any suitable means, such as a coiled spring or air-cushion, as will be readily understood. As the beams 29 are lowered the rails 87 will fall likewise, their forward ends sliding downward against the oblique ribs 91. In this position the mold can be readily inserted in place by simply placing the rear end of it on the ways 30 and pushing it up the tracks 87, which direct it into locking engagement with the plate 84 in the manner above described. It will then be locked in this position by a pair of suitable catches 94, secured to the rails 87, which hook over the forward edge of the mold, as shown in Fig. 4. The lever 44 being then operated to raise the beams 29 up into horizontal position again, the ends of the rails 87 will be forced to slide up the ribs 91, thus raising the mold in its turn, and by this movement the catches 94 will act to force the mold into closer engagement with the plate 82, so that it is now tightly held between the plate 82 and the catches 94. In some cases I prefer to omit the ribs 91 altogether and cause the raising of the rails 87 to take place by means of the guide-brackets 89.

In the upper portion of the press-box is arranged a pressure-platen 95, which fills more or less completely the sectional area of the box and reciprocates between the upper end thereof and the offsets 78. This platen is supported when pressure is brought thereon by a pair of screw-stems 96, solidly mounted on its upper side in lugs 97 and extending through cross-beams 98, which rest in suitable recesses in the sides 75. The beams 98, if of wood, may be provided with steel strengthening-bars 99 and have each bolted thereto a steel yoke 100, in the central opening of which is mounted upon the screw-stem 96 a sprocket-nut 101, which is connected by a sprocket-chain 102 to a sprocket-wheel 103, mounted at one side of the press-box and supported therefrom by a laterally-projecting bracket 104. The sprocket-wheel 103 is keyed to a shaft, which carries also a bevel-gear 105, and this bevel-gear engages with a vertical bevel-gear 106, splined to a longitudinal rod 108, which is journaled in boxes 109, secured to the side of the posts 16, and has at its front end a hand-wheel 110. By means of the splined connection the bevel-gears 106, and through their intermediate connections the sprocket-nuts 101, may be turned by operating the hand-wheel, while at the same time the bevel-gears 106 slide freely on the rod 108, being maintained in proper engagement with the gears 105 by their mountings in upwardly-projecting ears 111, formed on the brackets 104. It will be seen, therefore, that by turning the hand-wheel 110 the platen 95 is depressed to force the material in the press-box down upon the mold, this operation being continuously performed as the sheets are taken out without stopping the machine.

In order to provide for filling the press-box, the beams 98, carrying the platen and other parts, are hinged at one side, as at 112, to the side of the press-box, and at their other ends they are provided with suitable latches 113, which engage under a catch-rod 114, so that when it is desired to fill the press-box the whole of the platen and connected parts may be simply turned over, leaving the top of the box open.

Figures 5, 6:
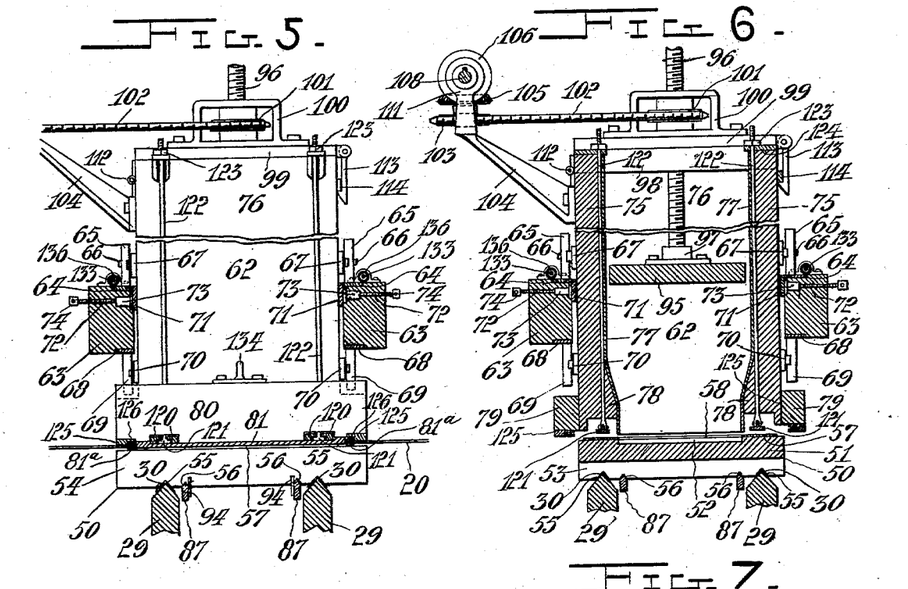
Fig. 5 is a front elevation of the press-box shown *in situ*, the supporting parts being shown in section.
Fig. 6 is a vertical transverse section of the same.

The material in the press-box being under constant pressure it is necessary to provide some means of support for said material during the time that the mold is being removed and another one substituted, at which time the beams 29 are lowered, and consequently the sustaining force removed from the bottom of the box. For this purpose I provide the division-plate 81, which is sufficiently wide to completely cover the lower end of the box, as shown in Fig. 5, this division-plate being preferably formed to interlock with the rear edge of the knife by a scarf-joint formed by a rectangular groove 115 in the back of the knife interlocking with a similar groove formed on the under side of the division-plate, Fig. 4. This division-plate is adjustably secured to the frame of the machine by a pair of bolts 116, which have one end flattened and formed with an eye, through which passes a bolt 117, secured to the front end of the division-plate, while the other end of each bolt 116 passes through a hole in a cross-bar 118, secured to the posts 16, and the bolt 116 is adjusted and clamped in position by lock-nuts 119. By this construction the knife is protected against being pulled backwardly by the press-box on its backward movement, and to prevent undue sagging of the knife beneath the press-box during the time the mold is removed I preferably arrange a pair of clips or fingers 81$^a$, which project from the lower face of the division-plate at each side thereof and take under the knife, so as to support the same.

Figures 7, 8, 9:
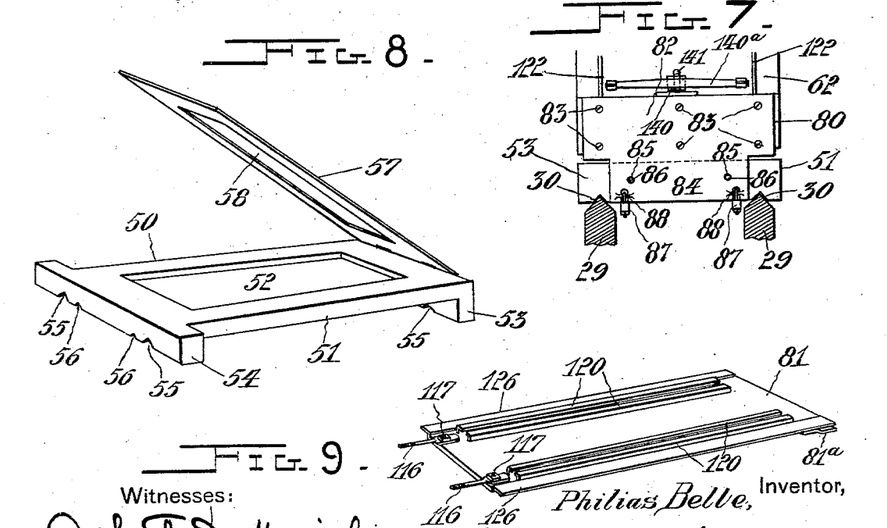
Fig. 7 is an enlarged detail rear elevation of the lower part of the press-box and mold, showing the mechanism for locking the latter in place.
Fig. 8 is a perspective view of the mold.
Fig. 9 is a similar view of the division-plate.

The division-plate 81 is provided on its upper side with two pairs of angle-shaped overhanging guide-ribs 120, which serve the purpose not simply of strengthening the plate against transverse bending forces or endwise compression forces, but also of interlocking it with a pair of longitudinal T-bars 121, which project below the bottom of the press-box and are secured thereto by a set of vertical bolt-rods 122, which have nuts 123 at their upper end resting on plates 124. The forward ends of the T-bars 121 engage at all times between the angular ribs 120, and when the press-box is in its forwardmost position the division-plate is completely locked and secured to the bottom of the press-box, so as to support the material therein against the pressure of the platen 95 during the time that the mold is being changed. Furthermore, in order to further strengthen the connection between the division-plate and press-box, as well as to rigidify the former and prevent it from lateral motion, I may secure on the under side of the beams 79 longitudinal grooved bars 125, which engage with offset flanges 126, formed on the lateral edges of the division-plate, as shown in Figs. 5 and 9.

Figure 2:
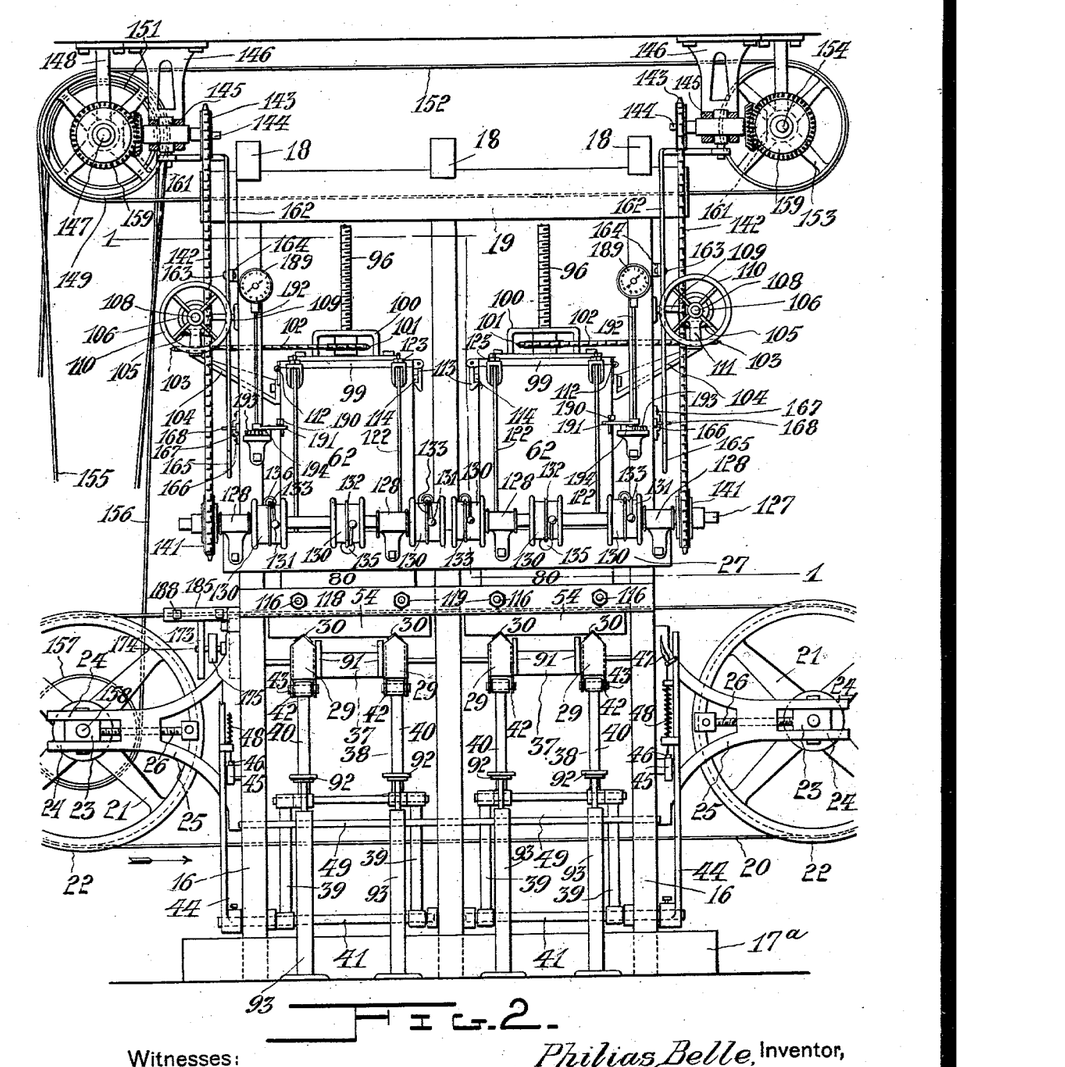
Fig. 2 is a front elevation of the same machine as that shown in Fig. 1.
Figure 3:
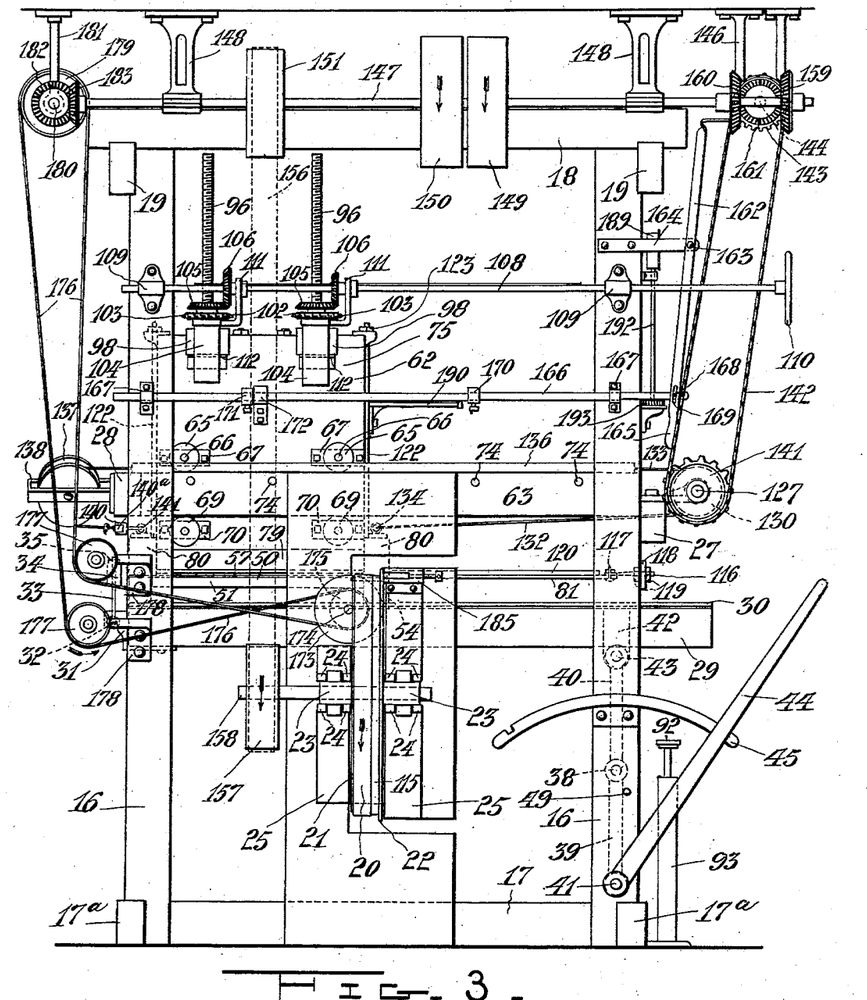
Fig. 3 is a side elevation of the same from the left-hand side.

I will now describe the apparatus shown by which the press-box 62 and the mold attached thereto are given a reciprocating movement along the beams 29 and 63. Across the front of the machine is journaled a shaft 127 in suitable journal-boxes 128, fixed to the transverse beam 27, and on this shaft are fixed a series of flanged drums 130, shown as three in number. To each of these drums is secured, as by pins 131, one end of one of the cords or wire ropes 132 133, the opposite end of the under rope 132 (which is attached to the central drum 130) being secured to a ring 134, fastened to the front beam 80 of the press-box, passing through a hole 135 in the beam 27. The upper cords 133 (attached to the side drums 130) pass through pipes 136, resting on the side beams 63 and pass around sheaves 137, mounted in hangers secured to the transverse beam 28 at the rear of the machine, and the ends of the cords 133 are secured to eyes 140 on opposite ends of a whiffletree 140$^a$, which engages with an eye 141, mounted on the beam 80 at the rear of the press-box. By this connection it will be seen that the rotation of the shaft 127 in one direction causes the press-box 62 to be moved forward and in the opposite direction to be moved back. For rotating the shaft 127, one of which is provided independently for each machine unit, a sprocket-wheel 141 is keyed to one end of the shaft which is connected by a chain 142 with another sprocket-wheel 143, keyed to a short jack-shaft 144, journaled in a sliding block 145, which is mounted in a hanger-yoke 146, so as to have a short transverse sliding movement. Adjacent to the shaft 144 and at right angles thereto is a power-shaft 147, supported in hangers 148 and having a number of pulleys 149 150 151 thereon, as may be required. As shown in Fig. 2, one of the pulleys 149 has a belt 152, which runs over a pulley 153, which serves to turn a similar power-shaft 154, which operates a second machine unit at the right hand of Fig. 2 and which is otherwise similarly arranged to the shaft 147. The pulley 150 is the driving-pulley of the entire machine and is operated by means of a power-belt 155. The pulley 151 serves to operate the band-knife, being connected by a belt 156 to the pulley 157 on the shaft 158 of one of the pulleys 21, as described.

On the forward end of the shaft 147, as also of the shaft 154, are fixed two bevel-gears 159 160, which face each other and are arranged to alternatively engage with a bevel-gear 161 mounted on the adjacent end of the jack-shaft 144. It will be obvious that the jack-shaft may be made to turn in either direction, according to the engagement of the gear 161 with one or other of the gears 159 and 160, correspondingly altering the direction of motion of the press-box 62. This change is brought about by a shifting-lever 162, which is pivoted at 163 on the bracket 164, secured to the adjacent post 16, and which is connected at its upper end to the sliding block 145, as shown, and the lower end of the lever 162 may be made in the form of a handle 165, to be operated by hand as the press-box reaches either extremity of its travel; but I prefer to arrange it to be operated automatically by the press-box itself to throw the gear 161 out of engagement with the gears 159 160 at each end of its travel, and thus to automatically stop the motion of the press-box. This may be done in a number of ways, of which that illustrated in the drawings is an example. In this case I arrange a longitudinal shifting rod 166, supported by straps 167 on the side of the posts 16 and having at its front end a pin 168, which engages in a slot 169 in the lower end of the lever 162. On the rod 166 are adjustably clamped two collars or dogs 170 171, which are engaged, respectively, at the forward and rear extremities of the travel of the press-box by a bracket-arm 172, projecting from the side of the press-box. It will be seen that in either case the gear 161 is automatically thrown out as soon as the press-box has reached the end of its travel, and, if desired, the arrangement may be such that it is thrown into gear with the opposite gear-wheel, and thus the press-box kept reciprocating continuously in opposite directions; but this would not be desirable at the forward reach, because time must be given for the exchange of molds.

Figures 1, 16:
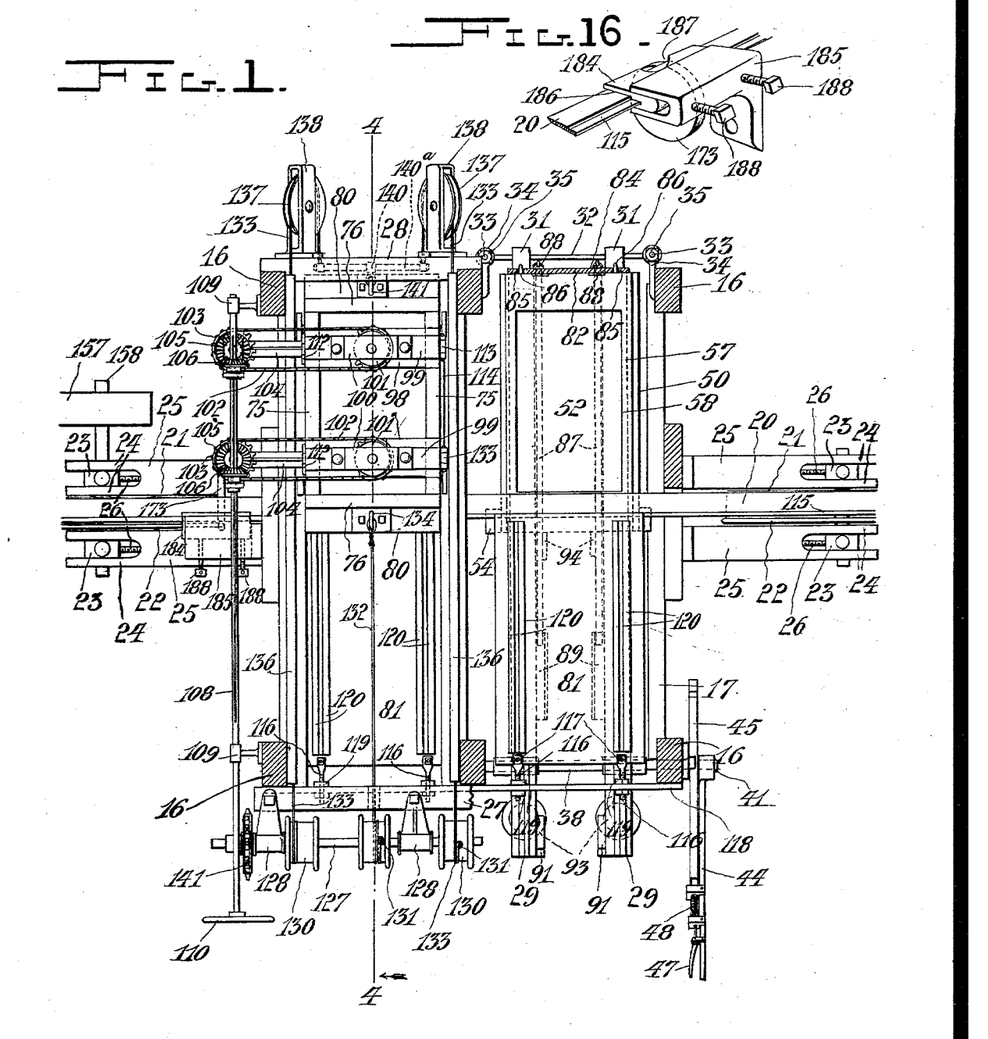
Figure 1 is a plan section of a double machine of the first form above referred to, being the preferred form of my invention, the section being taken on the line 1 1 of Fig. 2.
Fig. 16 is a perspective view of a detail showing the knife-guide for the grinding-wheel.

In order to keep the knife continuously sharp, I arrange an emery-wheel 173, mounted on an overhanging shaft 174, secured to one of the brackets 25, as shown in Fig. 2, there being on the shaft of the emery-wheel a pulley 175, over which passes a belt 176, which passes likewise over guide-pulleys 177, mounted on brackets 178 at the rear of the machine, and likewise over a driving-pulley 179, mounted on a short transverse jack-shaft 180, journaled in a hanger 181 adjacent to the shaft 147 and carrying on its end next to said shaft a bevel-gear 182, which engages with another bevel-gear 183 on the end of the shaft 147. This emery-wheel being run in constant contact with the knife keeps it constantly sharp, the knife resting thereon by its own weight; but as it is desirable to steady the knife, and thus produce a straighter and evener edge thereon, I prefer to provide an adjustable guide-block 184 for said knife, which is shown in detail in Fig. 16. This guide-block is supported in a grooved bracket 185, mounted on the side of the frame of the machine, and has on its front edge a groove 186, through which the knife passes and which holds it in proper position for the action of the emery-wheel, and said groove 186, as shown, has a gouge or recess 187 in the center thereof through which the edge of the emery-wheel 173 passes, the block 184 being adjustable in position by means of a pair of set-screws or bolts 188, which are threaded into sockets in the bracket 185. It will be understood that while I have shown this wheel on the upper lap of the knife at the point at which it issues from the press-boxes, still it may be mounted at any point thereon as may be most convenient, and, moreover, in cases where a large number of units are used, all mounted side by side and served by the same knife, I propose to have several emery-wheels located at regular intervals between the units, so that the knife cannot possibly become dull from having to cut too great an amount of material before being resharpened.

I prefer to provide for keeping count of the amount of work done by the machine a registering device consisting of a dial 189, provided with a hand, which is advanced through one number of the register each time the press-box reaches the forward limit of its travel. The press-box is provided with a forwardly-projecting trip 190, mounted on the side thereof, which engages with a pawl-lever 191, which is loosely mounted on the lower end of the operating-shaft 192 of the dial, which has keyed to its lower end below the lever 191 a ratchet-wheel 193, acted on by a pawl 194, mounted on the lever. The pawl-lever is normally held in its rearmost position by a spring or other convenient arrangement and at each advance of the press-box is struck by the trip 190 and caused to advance the ratchet-wheel 193 through a distance of one tooth, thus operating the register.

Figure 13:
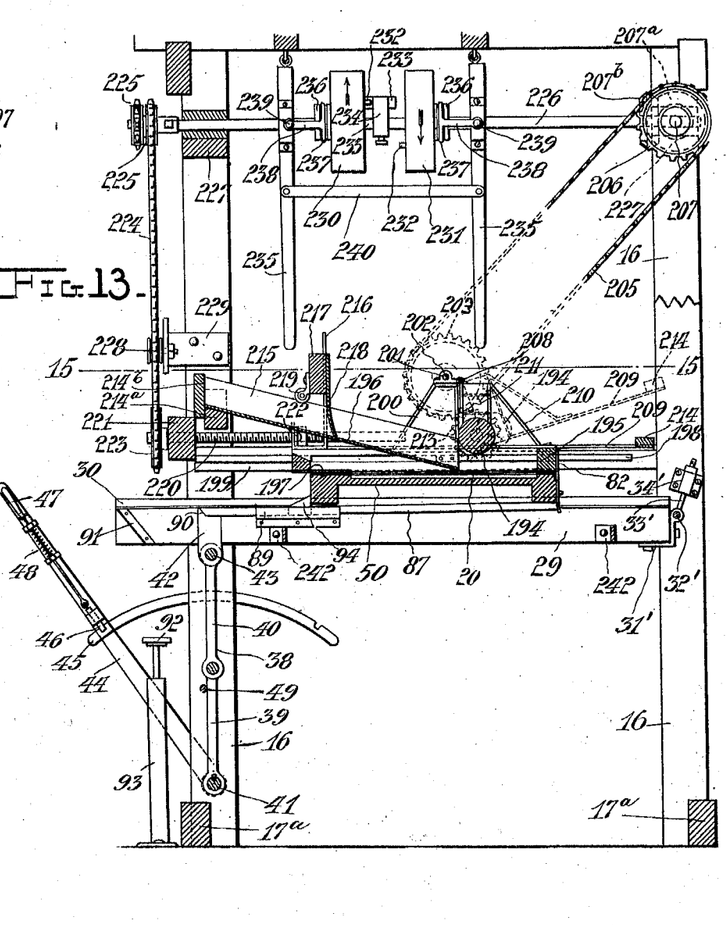
Figs. 13, 14, and 15 are respectively a longitudinal section, a front elevation, and a sectional plan view of the modified form of my invention, hereinabove referred to, the section plane of Fig. 15 being indicated by the line 15 15 in Fig. 13.
Figure 14:
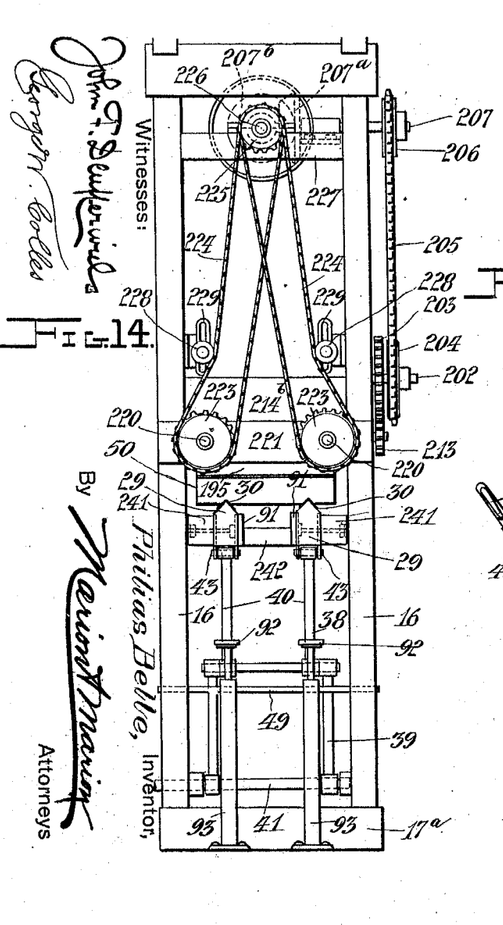
Figure 15:
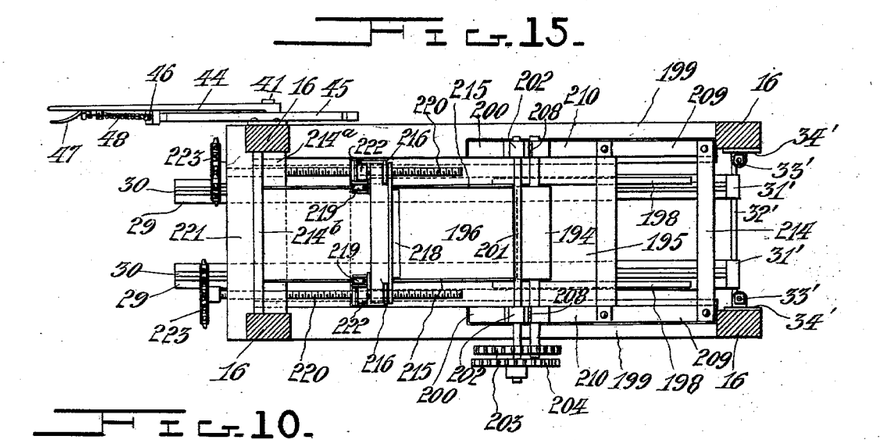

Before describing the modified form of machine unit, which is illustrated in Figs. 13 to 15, inclusive, I will describe the general mode of operation of the form already described. Supposing the press-box 62 to be filled with raw material, comprising a mixture of well-soaked and preferably finely-shredded leather scrap and paste or other adhesive, the whole being in a viscous state, the cover of the press-box is put on and the platen depressed by operating the handle 110. During this time unless the mold is in proper place the press-box should be at the front end of its movement, so that its bottom is covered by the division-plate 81, the beams 29 being in lowered position. The mold having a sheet 59 of flexible material, as already described, spread thereover and covered by the cover-plate 57 is pushed up the ways 30 until caught and locked by the catches 94, whereupon the lever 44 is brought forward and the toggle-joint 38 straightened, raising the beams 29 and clamping the mold solidly in position, as above said. The shifting-lever 162 is now pulled forward to the limit of its movement, which causes the gear 161 to become engaged with the gear 160, whereupon the shaft 127 is set rotating and the press-box returned to the opposite extremity of its travel, when the bracket 172 strikes the dog 171, which brings the press-box to a stop. The hand-wheel 110 is now operated to depress the platen 95 by a distance equal to the thickness of the recess in the mold, whereupon the lever 162 is again shifted to bring the press-box forward again. On its forward movement the knife 20, being moved at a rapid rate, rapidly cuts through the material, leaving a sheet or layer thereof in the mold and permitting the excess in the press-box to pass over the knife and to be supported by the plate 81. The beams 29 are then lowered, the mold taken out and replaced by another, which is prepared by another operative, and stands ready for use, which is again pushed into the machine, the beams 29 raised, and the operation repeated. The register 189 records accurately the number of sheets which have been turned out.

In the embodiment of my machine shown in Figs. 13, 14, and 15 the frame, the horizontal beams 29, ways 30, mold 50, toggle-joint 38, hand-lever 44, pedestals 92, and the parts immediately connected therewith are the same as in the machine previously described; but the press-box is entirely dispensed with, as in this machine the material is not compressed into molds at all by a regular pressure, but is merely laid therein and subsequently compacted and depressed by a reciprocating roller 194. The receptacle for the material comprises a rectangular frame 195, which has an open bottom covering the recess in the mold and exactly fitting the same, the interior of the frame being a little longer than that of the mold for the purpose of accommodating the inclined division-plate 196; but a plate 197 extends across the front portion of the lower side of the frame, so as to limit the opening to the size of the recess in the mold. This frame has secured to its rear side a plate 82 exactly similar to that already described and being provided with the hinged rails 87, all precisely the same as in the first form of the machine. The frame 195 is grooved at each side to receive the longitudinal slide-bars 198, secured to longitudinal beams 199 at the side of the frame. On each of the beams 199, at either side of the reciprocating frame 195, is mounted an upstanding frame 200, carrying journal-boxes 201, in which is mounted a shaft 202, carrying on its right-hand end, Fig. 14, a gear-wheel 203 and a sprocket-wheel 204, over which passes a driving-chain 205, driven from a sprocket-wheel 206 on a jack-shaft 207, which is journaled in the upper portion of one of the rear posts of the frame and carries at its other end a bevel-gear 207ª, engaging with a gear 207ᵇ on the main shaft 226. The gear and sprocket wheels 203 and 204 and part of the driving-chain 205 are indicated in dotted lines in Fig. 13, as they would not, in fact, show in this figure, which is a section. To the upper edge of the two frames 200 is hinged, as at 208, a three-sided frame 209, having at each side an upstanding member 210, corresponding to the frames 200 and carrying each a journal-block 211, in which is mounted the wooden or metallic roller 194, extending across and over the opening in the frame 195 and being arranged to reciprocate therein. The shaft of the roller has on its right-hand end a gear-pinion 213, which engages continuously with the gear 203 in all positions of the frame 209, the latter being arranged to be oscillated either by hand or automatically about its hinge 208. For this purpose there is shown in the present design a cross-bar 214 at the rear of the frame 209, which may be worked up and down by an operative or may, if desired, be connected by a crank and pitman or similar means to the overhead shafting and worked automatically. The division-plate 196 in this embodiment of my machine is inclined upwardly for the purpose which will be presently seen. The material just before passing to the knife 20 is compacted by the pounding action of the roller 194 and evenly distributed over the mold, the excess being pushed up into the inclined division-plate 196, which is firmly secured to transverse beams 214ª and 214ᵇ at the front of the machine and has, as shown, upwardly-turned flanges 215 at each side, so as to prevent the material from dropping off. On opposite sides of the forward end of the frame 195 are mounted a pair of upstanding bracket-arms 216, which embrace the division-plate between them and carry slidably mounted thereon a cross-beam 217 over the upper side of the division-plate. This cross-beam has fixed thereto a depending plate 218, the lower edge of which scrapes against the bottom of the division-plate, as shown, and, further, a pair of casters or rollers 219 at the opposite sides, which rest on the inclined edges of the flanges 215. When the frame and mold are carried forward, the cross-beam 217 and plate 218 are necessarily carried up the incline by the rollers 219, coacting with the arms 216, and when the frame moves backward again they descend the incline, the plate 218 pushing before it the excess of material, so that it is laid out and distributed again on the surface of the mold and compacted and distributed by the roller 194 as it passes under it.

For reciprocating the frame 195 the same arrangement may be used as heretofore described; but a somewhat different arrangement has been herein illustrated. In this case I have provided two longitudinal screw-stems 220, one at each side of the frame 195, journaled in the transverse beam 221 and having engaging therewith a pair of nuts 222, fixed to the frame 195, so that the rotation of the screws 220 in either direction will cause the frame 195 to move longitudinally in the corresponding direction. On the forward end of each screw-stem 220 is fixed a sprocket-gear 223, which is connected by a chain 224 to one of a pair of sprocket-wheels 225, mounted on the forward end of the main shaft 226, the latter being mounted on transverse beams 227 near the upper ends of the frame-posts. Suitable tightening-rollers 228 press laterally on each of the chains 224 at the outside, these being adjustably mounted in slotted brackets 229, fixed to the frame-posts, as shown. The main shaft in this form of the invention is run alternatively in opposite directions by means of two pulleys 230 231, over which pass open and crossed belts running from a line of overhead shafting or elsewhere. Each of these pulleys is provided with a lateral projecting dog 232, one of which engages, when the shaft 226 is thrown into operation, with one of a pair of lateral wings 233, formed on an adjustable dog 234, clamped to the shaft between the two pulleys 230 231. The pulleys 230 231 are mounted to turn loosely on the shaft 226 and are also slidable thereon, being held in position by a pair of shifting-levers 235, pivoted to overhead portions of the frame. The pulleys have laterally-extending annularly-grooved hubs 236, with which engage ring collars 237, each of which has an arm 238 pivoted to one of the levers 235, as shown at 239. The two levers are held parallel to each other by a cross-bar 240, so that at no time can both pulleys be shifted into simultaneous engagement with the dog 234. It will be readily seen that by shifting either of the levers 235 to one side the shaft 236 will be rotated in one direction or the other, according to the direction in which the lever is shifted.

In order to assist the beams 199 in preventing lateral movement, blocks 241 are bolted to the outer side of the beams 29, which abut against the side posts 16 of the frame, and the beams 29 are held in a rigid relation to each other by means of cross-straps 242.

The mode of suspending the beams 29 differs somewhat in this form of the invention from that previously shown, they being provided with angular hinge-straps 31', mounted on a pintle 32', which is supported at its ends by a pair of eyebolts 33', adjustably mounted in bracket-lugs 34'.

The mode of operation of the second form of my machine will be already clear from the previous description, and further description need not, therefore, be given. It may be said, further, that in this form, which is rather simpler and less expensive than the first form, two operatives are required, one to shift the lever 235 and operate the roller 194 and the other to operate the lever 44 and remove and replace the molds. The roller 194 is turned in the same direction in which the mold-frame 195 moves, be that backward or forward, the excess of material passing up the inclined plate 196 and being returned on the next backward movement of the frame 195 and distributed into the mold again, as already described.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim as new, and desire to secure by Letters Patent, is—

1. A machine for making pasted stock comprising a mold having a recess in one side thereof of the shape of the finished material, means for compacting the raw material within said recess, a knife adapted to slide across the open face of said recess, means for causing said knife to pass over the open face of said recess, and means for moving said knife transversely in the direction of its length.

2. A machine for making pasted stock comprising a mold having a recess in one side thereof of the shape of the finished material, means for compacting the raw material within said recess, a knife adapted to slide across the open face of said recess, means for causing said knife to pass over the open face of said recess, means for moving said knife transversely in the direction of its length, and means for compacting the raw material in said mold prior to reaching said knife.

3. In a machine for making pasted leather stock, the combination of a pair of longitudinal ways, a mold slidable thereon in the direction of its length and having a recess of the shape of a piece of finished material in one side parallel to its direction of movement, and a transverse knife mounted over the open face of said recess and having its edge directed against the forward direction of movement of the mold, whereby the longitudinal movement of said mold causes the knife to be slid across the open face thereof to remove excess of material.

4. In a machine for making pasted leather stock, the combination of a pair of longitudinal ways, a mold slidable thereon in the direction of its length and having a recess of the shape of a piece of finished material in one side parallel to its direction of movement, a transverse knife mounted over the open face of said recess and having its edge directed against the forward direction of movement of the mold, whereby the longitudinal movement of said mold causes the knife to be slid across the open face thereof to remove excess of material, and means for compacting the material in said mold prior to the action of the knife thereon.

5. In a machine for making pasted leather stock, the combination of a pair of longitudinal ways, a mold slidable thereon in the direction of its length and having a recess of the shape of a piece of finished material in one side parallel to its direction of movement, a transverse knife mounted over the open face of said recess and having its edge directed against the forward direction of movement of the mold, whereby the longitudinal movement of said mold causes the knife to be slid across the open face thereof to remove excess of material, and a division-plate located at the rear side of said knife and adapted to retain the excess of material removed by said knife.

6. In a machine for making pasted leather stock, the combination of a pair of longitudinal ways, a mold slidable thereon in the direction of its length and having a recess of the shape of a piece of finished material in one side parallel to its direction of movement, a transverse knife mounted over the open face of said recess and having its edge directed against the forward direction of movement of the mold, whereby the longitudinal movement of said mold causes the knife to be slid across the open face thereof to remove excess of material, means for compacting the material in said mold prior to the action of the knife thereon, and a division-plate located at the rear side of said knife and adapted to retain the excess of material removed by said knife.

7. In an apparatus for making pasted leather stock, a mold comprising a base-plate having a recess in its upper face conforming to the shape of the finished material, and a metallic plate fitting over the upper face of said mold and having a central aperture corresponding to said recess, said metallic plate being hinged to said mold at an edge.

8. A mold for making pasted leather stock in sheets comprising a base-plate having a shallow recess in its upper side corresponding in dimensions to the size and thickness of the finished sheet, and a metallic plate fitting over the upper side of said mold and having an aperture therein corresponding in size to the open upper face of said recess, said cover-plate being hinged at one edge thereof.

9. A mold for making pasted leather stock in sheets comprising a base-plate having a shallow recess in its upper side corresponding in dimensions to the size and thickness of the finished sheet, a metallic plate fitting over the upper side of said mold and having an aperture therein corresponding in size to the open upper face of said recess, and a pair of transverse ribs projecting from the under surface of said mold and having means thereon for guiding the same to slide on ways.

10. In a machine for making pasted leather stock, a mold comprising a flat base-plate having a recess in its upper side conforming to the shape of the finished article, and a pair of transverse ribs projecting from the lower surface of said base-plate, said ribs being provided with means for guiding the same to slide on longitudinal ways.

11. In a machine for making pasted stock, the combination of a knife movable in the direction of its length and having a rabbeted groove in the rear edge thereof, and a stationary division-plate forming substantially a continuation of the knife-plate and having likewise a rabbeted groove in its edge, the two grooves being arranged to fit into each other to form a scarf-joint, whereby the upper and under surfaces of the knife and division-plate are continuous.

12. In a machine for making pasted stock, the combination of longitudinal ways, a mold mounted to slide thereon and having a recess in the upper face thereof to receive the raw material, a knife mounted transversely over the upper face of said mold, means for moving said knife in the direction of its length, and means for moving said mold longitudinally against the edge of said knife.

13. In a machine for making pasted stock, the combination of longitudinal ways, a mold mounted to slide thereon and having a recess in the upper face thereof to receive the raw material, a knife mounted transversely over the upper face of said mold, means for moving said knife in the direction of its length, means for moving said mold longitudinally against the edge of said knife, and means for compacting the raw material in said mold prior to the passage of the knife therethrough.

14. In a machine for making pasted stock, the combination of longitudinal ways, a mold mounted to slide thereon and having a recess in the upper face thereof to receive the raw material, a knife mounted transversely over the upper face of said mold, means for moving said knife in the direction of its length, means for moving said mold longitudinally against the edge of said knife, and a division-plate at the rear edge of said knife adapted to completely cover said mold after the latter has been moved thereunder.

15. In a machine for making pasted stock, the combination of longitudinal ways, a mold mounted to slide thereon and having a recess in the upper face thereof to receive the raw material, a knife mounted transversely over the upper face of said mold, means for moving said knife in the direction of its length, means for moving said mold longitudinally against the edge of said knife, means for compacting the raw material in said mold prior to the passage of the knife therethrough, and a division-plate at the rear side of said knife.

16. In a machine for making pasted stock, the combination of longitudinal ways, a mold mounted to slide thereon and having a recess in the face thereof to receive the raw material, a knife mounted transversely over the upper face of said mold, means for moving said knife in the direction of its length, means for moving said mold longitudinally against the edge of said knife, means for compacting the raw material in said mold prior to the passage of the knife therethrough, and a division-plate at the rear side of said knife, said division-plate and knife being arranged to fit into each other with scarf-joints, substantially as described.

17. In a machine for making pasted stock, the combination of a frame guided to move on longitudinal ways or guides and having a bottomless receptacle for holding the raw material, a mold having a recess therein adapted to receive the raw material, means for locking said mold in position below the bottom of said frame and in line therewith, said means being such as to leave an open slot at the front and both sides between the bottom of said frame and the top of said mold, a knife transversely moving in said slot, a division-plate at the rear of said knife, and means for advancing said frame across the edge of said knife.

18. In a machine for making pasted stock, the combination of longitudinal guides, a frame mounted to move thereon, a mold removably secured to the bottom of said frame, said frame having a bottomless recess therein adapted to hold the raw material and disposed above the molding-recess in said mold, a pair of pulleys mounted on either side of said frame, an endless band-knife mounted on said pulleys and moving transversely across the under side of said frame and between it and the mold, and means for moving said frame and mold longitudinally across the edge of said knife.

19. In a machine for making pasted stock, the combination of a mold, means for moving said mold longitudinally, a pair of pulleys between which said mold is mounted, and a band-knife mounted on said pulleys and moving transversely across the face of said mold.

20. A machine for making pasted stock comprising a mold having a recess therein open at one side, means for moving said mold longitudinally in the plane of its open side, a pair of pulleys on opposite sides of said mold, a band-knife mounted on said pulleys, one lap of which is adjacent to the open face of said mold, and means for compacting the raw material in the mold prior to passing said knife therethrough.

21. A machine for making pasted stock comprising a mold having a recess therein open at one side, means for moving said mold longitudinally in the plane of its open side, a pair of pulleys on opposite sides of said mold, a band-knife mounted on said pulleys, one lap of which is adjacent to the open face of said mold, and means for tightening said knife.

22. A machine for making pasted stock comprising a mold having a recess therein open at one side, means for moving said mold longitudinally in the plane of its open side, a pair of pulleys on opposite sides of said mold, a band-knife mounted on said pulleys, one lap of which is adjacent to the open face of said mold, and a grinding-wheel rotated adjacent to the edge of said knife.

23. A machine for making pasted stock comprising a mold having a recess therein open at one side, means for moving said mold longitudinally in the plane of its open side, a pair of pulleys on opposite sides of said mold, a band-knife mounted on said pulleys, one lap of which is adjacent to the open face of said mold, means for compacting the raw material in the mold prior to passing said knife therethrough, means for separating said pulleys one from the other to tighten said knife, a grinding-wheel arranged to rotate adjacent to the edge of said knife, and a source of power driving said pulleys and grinding-wheel and the means for moving the mold longitudinally, whereby all are moved from the same source of power.

24. A machine for making pasted stock comprising a bottomless receptacle adapted to receive a quantity of raw material and mounted to reciprocate longitudinally, a mold coacting with said receptacle and having a recess therein open at the upper side and corresponding in shape to the open bottom of said receptacle, means for locking the mold in place beneath the bottom of said receptacle and slightly separated therefrom, leaving between the mold and receptacle a slit open in front and at both sides, a transversely-moving knife mounted in said slit, a pair of longitudinal beams having ways on which said mold is supported, and means for closing the bottom of said receptacle temporarily while the mold is being removed.

25. A machine for making pasted stock comprising a bottomless receptacle adapted to receive a quantity of raw material and mounted to reciprocate longitudinally, a mold coacting with said receptacle and having a recess therein open at the upper side and corresponding in shape to the open bottom of said receptacle, means for locking the mold in place beneath the bottom of said receptacle and slightly separated therefrom, leaving between the mold and receptacle a slit open in front and at both sides, a transversely-moving knife mounted in said slit, a pair of longitudinal beams having ways on which said mold is supported, means for closing the bottom of said receptacle temporarily while the mold is being removed, said beams being hinged at one end thereof, and means for raising and lowering the opposite ends of said beams.

26. A machine for making pasted stock comprising a bottomless receptacle adapted to receive a quantity of raw material and mounted to reciprocate longitudinally, a mold coacting with said receptacle and having a recess therein open at the upper side and corresponding in shape to the open bottom of said receptacle, means for locking the mold in place beneath the bottom of said receptacle and slightly separated therefrom, leaving between the mold and receptacle a slit open in front and at both sides, said means comprising an abutment-piece 82 depending from the rear side of said frame, guide-pins on the rear end of the mold engaging with holes in said piece, and a pair of rails hinged to said piece and projecting forward; a transversely-moving knife mounted in said slit, a pair of longitudinal hinged beams having ways on which said mold is supported, means for closing the bottom of said receptacle temporarily while the mold is being removed, means carried by said hinged beams for supporting the front end of said rails, and catches formed on said rails adapted to hook over the front end of said mold when in place beneath the frame to hold it in place.

27. A machine for making pasted stock comprising a bottomless receptacle adapted to receive a quantity of raw material and mounted to reciprocate longitudinally, a mold coacting with said receptacle and having a recess therein open at the upper side and corresponding in shape to the open bottom of said receptacle, means for locking the mold in place beneath the bottom of said receptacle and slightly separated therefrom, leaving between the mold and receptacle a slit open in front and at both sides, said means comprising an abutment-piece 82 depending from the rear side of said frame, guide-pins on the rear end of the mold engaging with holes in said piece, and a pair of rails hinged to said piece and projecting forward; a transversely-moving knife mounted in said slit, a pair of longitudinal hinged beams having ways on which said mold is supported, means for closing the bottom of said receptacle temporarily while the mold is being removed, means carried by said hinged beams for supporting the front end of said rails, catches formed on said rails adapted to hook over the front end of said mold when in place beneath the frame to hold it in place, and means on said longitudinal beams for raising the front ends of said rails when the beams themselves are raised.

28. A machine for making pasted stock comprising a press-box guided to reciprocate longitudinally, said press-box having an open bottom and top, a mold removably mounted beneath said press-box and having a molding-recess therein conforming with the shape of the lower end of said press-box, means for locking said mold in position on the lower end of said press-box, a transversely-moving knife between said press-box and mold, means for moving said press-box and mold together against the edge of said knife to divide the material across the face of the mold, and a pressure-platen mounted in the upper portion of said box.

29. A machine for making pasted stock comprising a press-box guided to reciprocate longitudinally, said press-box having an open bottom and top, a mold removably mounted beneath said press-box and having a molding-recess therein conforming with the shape of the lower end of said press-box, means for locking said mold in position on the lower end of said press-box, a transversely-moving knife between said press-box and mold, means for moving said press-box and mold together against the edge of said knife to divide the material across the face of the mold, a pressure-platen mounted in the upper portion of said box, a division-plate at the rear of said knife adapted to cover the bottom of said pressure-box, and means for securing said division-plate temporarily to said press-box whereby the material is retained under pressure therein.

30. A machine for making pasted stock comprising a press-box guided to reciprocate longitudinally, said press-box having an open bottom and top, a mold removably mounted beneath said press-box and having a molding-recess therein conforming with the shape of the lower end of said press-box, means for locking said mold in position on the lower end of said press-box, a transversely-moving knife between said press-box and mold, means for moving said press-box and mold together against the edge of said knife to divide the material across the face of the mold, a pressure-platen mounted in the upper portion of said box, means for depressing said pressure-platen within said press-box, stationary hand-operated means carried by the frame of the machine for operating said depressing means, and connections between said platen and said hand-operated means whereby the same may be operated independently of the longitudinal movement of the box.

31. A machine for making pasted stock comprising a press-box guided to reciprocate longitudinally, said press-box having an open bottom and top, a mold removably mounted beneath said press-box and having a molding-recess therein conforming with the shape of the lower end of said press-box, means for locking said mold in position on the lower end of said press-box, a transversely-moving knife between said press-box and mold, means for moving said press-box and mold together against the edge of said knife to divide the material across the face of the mold, a pressure-platen mounted in the upper portion of said box, means for depressing said pressure-platen within said press-box, stationary hand-operated means carried by the frame of the machine, connections between said platen and said hand-operated means whereby the platen may be operated independently of the longitudinal movement of the box, transverse rails on which the pressure-platen and its connections are mounted, hinges connecting said transverse rails at one end to one side of the pressure-box, and catches adapted to secure the other end of said transverse rails in closed position at the other side of said box.

32. A machine for making pasted stock comprising an open-bottomed receptacle arranged to reciprocate longitudinally in guides, a mold having a recess in its upper face corresponding to the open bottom of said receptacle, means for locking said mold in place beneath the bottom of said receptacle, means for supporting said mold in juxtaposition to said receptacle leaving a slit therebetween sufficient for the passage of a cutting-knife, a transversely-moving knife moving across said slit and adapted to divide the raw material between said mold and receptacle, means for moving said receptacle longitudinally in its guides in either direction, a rotating shaft connected with said means to operate the same in one or other direction according to its direction of rotation, a continuously-moving driving-shaft, clutch mechanism adapted to connect said first-named shaft with said driving-shaft to rotate in either of two directions according to the position of said clutch mechanism, and means operated by said receptacle for reversing said clutch mechanism automatically at either end of its travel.

33. A machine for making pasted stock comprising an open-bottomed receptacle arranged to reciprocate longitudinally in guides, a mold having a recess in its upper face corresponding to the open bottom of said receptacle, means for locking said mold in place beneath the bottom of said receptacle, means for supporting said mold in juxtaposition to said receptacle leaving a slit therebetween sufficient for the passage of a cutting-knife, a transversely-moving knife moving across said slit and adapted to divide the raw material between said mold and receptacle, a transverse shaft journaled at the front of the machine, drums mounted on said shaft, pulleys opposite said drums at the rear of the machine, flexible connections passing over said drums and pulleys and connected at their ends to said receptacle, whereby the rotation of said shaft in opposite directions causes opposite longitudinal movements of said receptacle, a driving-shaft having a pair of facing bevel-gears thereon, a jack-shaft at right angles to said driving-shaft, a block mounted to slide parallel to said driving-shaft in which said jack-shaft is mounted, a bevel-gear mounted on said jack-shaft and adapted to engage alternatively with either of said facing gears, mechanical connections between said jack-shaft and said first-mentioned shaft, and means for shifting said sliding block.

34. A machine for making pasted stock comprising an open-bottomed receptacle arranged to reciprocate longitudinally in guides, a mold having a recess in its upper face corresponding to the open bottom of said receptacle, means for locking said mold in place beneath the bottom of said receptacle, means for supporting said mold in juxtaposition to said receptacle leaving a slit therebetween sufficient for the passage of a cutting-knife, a transversely-moving knife moving across said slit and adapted to divide the raw material between said mold and receptacle, a transverse shaft journaled at the front of the machine, drums mounted on said shaft, pulleys opposite said drums at the rear of the machine, flexible connections passing over said drums and pulleys and connected at their ends to said receptacle, whereby the rotation of said shaft in opposite directions causes opposite longitudinal movements of said receptacle, a driving-shaft having a pair of facing bevel-gears thereon, a jack-shaft at right angles to said driving-shaft, a block mounted to slide parallel to said driving-shaft in which said jack-shaft is mounted, a bevel-gear mounted on said jack-shaft and adapted to engage alternatively with either of said facing gears, mechanical connections between said jack-shaft and said first-mentioned shaft, a shifting-rod connected with said block to operate the same, a pair of dogs mounted on said shifting-rod, and a bracket or projection mounted on the side of said receptacle between said dogs, whereby the striking of said bracket against either of said dogs causes the intermediate bevel-gear to be disengaged.

35. In a machine for making pasted stock, the combination of a press-box arranged to move in longitudinal guides, said press-box comprising a bottomless receptacle, a mold having a recess therein corresponding in shape with the open bottom of said receptacle, means for removably locking said mold in position beneath the bottom of said press-box, a transversely-moving knife, means for moving the knife in the direction of its length, means for moving said press-box and mold against the edge of said knife, a division-plate at the rear of said knife, and means for interlocking said division-plate with the bottom of said press-box.

36. In a machine for making pasted stock, the combination of a press-box arranged to move in longitudinal guides, said press-box comprising a bottomless receptacle, a mold having a recess therein corresponding in shape with the open bottom of said receptacle, means for removably locking said mold in position beneath the bottom of said press-box, a transversely-moving knife, means for moving the knife in the direction of its edge, means for moving said press-box and mold against the edge of said knife, a division-plate at the rear of said knife, and means for interlocking said division-plate with the bottom of said press-box, said means comprising a pair of overhanging flanges on the upper side of said division-plate, and longitudinal T-bars interlocking with said flanges on the under side of said press-box.

37. In a machine for making pasted stock, the combination of a press-box arranged to move in longitudinal guides, said press-box comprising a bottomless receptacle, a mold having a recess therein corresponding in shape with the open bottom of said receptacle, means for removably locking said mold in position beneath the bottom of said press-box, a transversely-moving knife, means for moving the knife in the direction of its edge, means for moving said press-box and mold against the edge of said knife, a division-plate at the rear of said knife, a pair of parallel beams having ways on which said mold is supported, said beams being pivoted at one end, a toggle-joint supporting the other end, and a hand-lever for straightening said toggle-joint.

38. In a machine for making pasted stock, the combination of a press-box arranged to move in longitudinal guides, said press-box comprising a bottomless receptacle, a mold having a recess therein corresponding in shape with the open bottom of said receptacle, means for removably locking said mold in position beneath the bottom of said press-box, a transversely-moving knife, means for moving the knife in the direction of its edge, means for moving said press-box and mold against the edge of said knife, a division-plate at the rear of said knife, a pair of parallel beams having ways on which said mold is supported, said beams being pivoted at one end, means for raising and lowering the free ends of said beams, and resiliently-supported pedestals upon which the ends of said beams are adapted to rest when lowered.

39. In a machine for making pasted stock, the combination of a transversely-moving knife, a mold moving beneath the same, and a division-plate at the rear side of said knife.

40. In a machine for making pasted stock, the combination of a transversely-moving knife, a mold moving beneath the same, and a division-plate at the rear side of said knife, said knife having a groove in its rear side interlocking with a similar groove in the edge of said division-plate to form a scarf-joint.

In witness whereof I have hereunto set my hand in the presence of two witnesses.

PHILIAS BELLE.

Witnesses:
J. A. MARION,
T. MYNARD.